Figure 1:
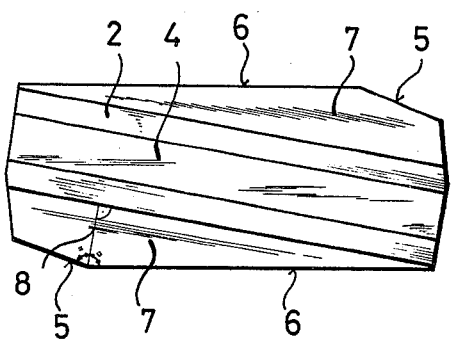

United States Patent [19]
Goeke

[11] 4,086,016
[45] Apr. 25, 1978

[54] CUTTING TOOL

[75] Inventor: Alfons Goeke, Solingen, Germany

[73] Assignee: Th. Kieserling & Albrecht, Solingen, Germany

[21] Appl. No.: 631,413

[22] Filed: Nov. 12, 1975

[30] Foreign Application Priority Data

Nov. 13, 1974 Spain .................................. 207.422

[51] Int. Cl.² .............................................. B26D 1/00
[52] U.S. Cl. .................................. 407/114; 407/116; 407/118
[58] Field of Search ...................................... 29/95, 96

[56] References Cited

U.S. PATENT DOCUMENTS

| 2,641,048 | 6/1953 | Vreeland | 29/95 R |
| 3,694,876 | 10/1972 | Erkfritz | 29/95 R |
| 3,815,194 | 6/1974 | Goeke | 29/96 |

FOREIGN PATENT DOCUMENTS

| 1,245,148 | 9/1960 | France | 29/96 |
| 750,530 | 1/1945 | Germany | 29/96 |
| 616,204 | 1/1949 | United Kingdom | 82/1 C |

Primary Examiner—Harrison L. Hinson
Attorney, Agent, or Firm—Edward E. Sachs

[57] ABSTRACT

A cutting tool for machining the outer surfaces of elongated workpieces such as wire, rod or pipe has main and secondary cutting edges intersecting one another at an included obtuse angle and the secondary cutting edge is substantially longer than the main cutting edge.

1 Claim, 2 Drawing Figures

U.S. Patent     April 25, 1978     4,086,016

CUTTING TOOL

The invention relates generally to cutting tools and, more particularly, to cutting tools for machining the outer surfaces of elongated workpieces such as wire, rod or pipe.

It is known to arrange cutting tools with a plurality of cutting edges so the tool can be adjusted in its holder several times to expose a new cutting edge and extend the useful life of the tool before sharpening or replacement is necessary. Cutting tools of this type are known in a wide variety of cross-sections, including triangular, hexagonal and octagonal. Tools of this type are made from material which is highly sensitive to damage by impact force and slender tools would break very easily. Therefore, tools used with heavy feeds to produce large chip widths have to be quite compact and bulky. This results in high material costs for the tool and the tool takes up a considerable amount of space.

In certain machines, such as peeling machines for peeling or machining the outer surfaces of elongated workpieces including wire, rod and pipe, the cutting tools are carried by a rotary cutter head. Massive cutting tools in a high speed rotary cutter head create serious problems because of the high centrifugal forces developed. Either the rotary cutter head must be held to a relatively low speed which holds up the production of the peeling machine, or the cutter head must be expensively constructed to withstand high centrifugal forces.

It is therefore the primary object of the present invention to provide a cutting tool which can be used in rotary cutter heads of high speed peeling machines or the like to achieve heavy feeds producing wide chip widths.

It is a further object of the present invention to provide a cutting tool which is relatively slender An aspect of the invention resides in a cutting tool having a cutting edge defined by main and secondary cutting edges intersecting one another at an included obtuse angle, and the secondary cutting edge being substantially longer than the main cutting edge. Specifically, the secondary cutting edge is between two and ten times the length of the main cutting edge, and the cutting tool achieves chip depth to chip width ratios of approximately one to fifty. This makes it possible to provide very heavy feeds and higher workpiece throughput in a peeling machine or the like.

In one arrangement, the cutting tool includes a carrier member of conventional steel having a pair of cutter inserts attached thereto on opposite sides of a carrier material web. In a preferred arrangement, the axis of the web intersects the longitudinal axis or longitudinal direction of feed of the cutting tool at an acute angle. This greatly reduces the structural dimensions of the cutting tool while maintaining high strength.

Each cutter insert has a chip deflecting step extending along the main and secondary cutting edges to produce a sufficiently short and easily removable chip, especially when machining certain tough materials. The chip deflecting step preferably extends substantially perpendicular to the line which bisects the included angle between the main and secondary cutting edges.

For a better understanding of the present invention, together with other and further objects thereof, reference is had to the following description taken in connection with the accompanying drawings, and its scope will be pointed out in the appended claims.

Figure 2:
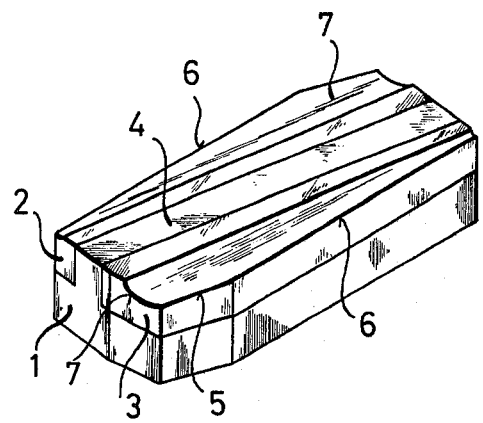

In the drawing:

FIG. 1 is a top plan view of a cutting tool constructed in accordance with the present invention; and FIG. 2 is a perspective illustration of the cutting tool of FIG. 1.

Referring now to the drawing, there is shown a cutting tool which basically includes a carrier member 1 and two cutter inserts 2 and 3. The carrier member 1 is normally made from a less expensive metal than the cutter inserts 2 and 3. The carrier member 1 has an integral web 4, and the inserts 2 and 3 are located on opposite sides of the web 1. The inserts 2 and 3 can be attached to the carrier member 1 in any conventional suitable manner.

The web 4 may be considered to be prismatic in shape and extends at an acute angle to the longitudinal direction of the cutting tool which is generally in the form of an octagonal prism.

Each of the cutter inserts 2 and 3 has a cutting edge defined by a main cutting edge 5 and a secondary cutting edge 6 intersecting one another at an included obtuse angle.

A chip deflecting step 7 extends along the main and secondary cutting edges 5 and 6 generally perpendicular to a bisecting line 8 which bisects the included angle between the main and secondary cutting edges 5 and 6. The bisecting line 8 also extends generally perpendicular to the longitudinal axis of the web 4.

The secondary cutting edge 6 is substantially longer than the main cutting edge 5, and may be between two and ten times the length of the main cutting edge 5. In a preferred arrangement, the secondary cutting edge 6 is approximately five times the length of the main cutting edge 5. In a peeling machine for machining the outer surfaces of elongated workpieces such as wire, rod and pipe, and having cutting tools carried by a rotary cutter head, the long secondary cutting edge makes it possible to achieve very heavy feeds. That is, very large chip widths can be removed from the workpiece. The length of the secondary cutting edge 6 is limited only by the torque acting upon the workpiece due to the cutting force. The travel of the secondary cutting edge indicates the longitudinal direction of the elongated workpiece worked upon by the cutting tool.

Due to centrifugal forces and other factors, the allowable mass and structural dimensions within a rotary cutter head are restricted. Arranging the web 4 at an angle to the longitudinal direction of the cutting tool with the special configuration of the main and secondary cutting edges makes the entire cutting tool narrower.

In general, the carrier member 1 may be considered as a block of material having opposite ends, opposite side edges and opposite faces. At least one of the faces is notched or rabbeted along the length of the block adjacent the side edges thereof for receiving cutter inserts. The notches are formed to leave the central web 4 upstanding between the notches. With the block considered as having a longitudinal axis extending between its opposite ends parallel to its side edges, the notches are formed to extend along lines at the web which intersect the longitudinal axis at small included acute angles substantially less than 90°. This means that the longitudinal web axis of the web 4 also intersects the longitudinal axis of the block at an included small acute angle substantially less than 90°.

The cutter inserts 2 and 3 have a shape and size corresponding to the size and shape of the notches for reception therein with the top surfaces of the inserts adjacent the web being substantially flush with the top surface of the web. Slightly outwardly from the web, each insert is rather sharply curved downwardly and then extends in a substantially flat plane outwardly to the edges 5 and 6 to define a chip deflecting step. The depth of the chip deflecting step from the edge 6 toward the web 4 decreases as one proceeds along the edge 6 from the intersection of the edges 5 and 6 away from the edge 5.

As shown in the drawing, the inserts 2 and 3 are reversely positioned so that the main cutting edge 5 of one insert generally faces toward one end of the cutting tool or block, while the main cutting edge 5 of the other insert generally faces toward the other end of the tool.

The longitudinal axis of the tool itself extends parallel to the secondary cutting edges 6 which are also parallel to one another. This generally corresponds to the direction of feed of the tool and to the axis of a workpiece worked upon by the tool. The axis of the web 4 extends at a small angle to the longitudinal axis of the tool so that the width of the inserts 2 and 3, and the notches they are received in, slowly decreases from adjacent the main cutting edges 5 toward the trailing ends of the secondary cutting edges 6.

The inserts 2 and 3 are generally four-sided when ignoring the relatively short side at the trailing end of the secondary cutting edge 6. The tool itself is generally eight-sided and can be reversed to use the cutting edge on either insert.

While there has been described what is at present considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A cutting tool having a cutting edge defined by main and secondary cutting edges intersecting one another at an included obtuse angle, said secondary cutting edge being substantially longer than said main cutting edge, a chip deflecting step extending along said cutting edge substantially perpendicular to a line bisecting said angle, with each of the two cutting edges having an angular relationship to said chip deflecting step converging and diverging in opposite directions; said tool comprising an insert having said cutting edge thereon and a carrier member for said insert, said carrier member having opposite ends, opposite side edges and opposite faces, a pair of said inserts attached to one of said faces in reversely positioned relationship to one another with said secondary cutting edges on said pair of inserts extending generally parallel to one another and said main cutting edges extending from said secondary edges to said opposite ends; said tool having a longitudinal axis of elongation and said carrier member having a web located between said inserts, said web having a web axis of elongation intersecting said longitudinal axis whereby said web extends generally diagonally across said carrier member, parallel to the chip deflecting step and perpendicular to said bisecting line.

* * * * *